United States Patent [19]

Yuda

[11] Patent Number: 4,723,503

[45] Date of Patent: Feb. 9, 1988

[54] ROBOTIC CONTROL APPARATUS

[76] Inventor: Lawrence F. Yuda, P.O. Box 176, Westminster, S.C. 29693

[21] Appl. No.: 876,787

[22] Filed: Jun. 20, 1986

[51] Int. Cl.[4] .......................... B25J 9/02; H01H 35/38; G01D 5/06

[52] U.S. Cl. ...................... 116/204; 116/202; 200/82 E; 324/208; 335/207; 340/686; 294/907; 901/46

[58] Field of Search .............. 277/224, 223; 200/82 E; 340/686, 679, 680, 603, 626; 74/49 A; 91/405; 294/115; 116/204, 202; 337/2; 324/208; 335/207

[56] References Cited

U.S. PATENT DOCUMENTS

| 2,266,692 | 12/1941 | Olson | 277/223 |
|---|---|---|---|
| 3,269,739 | 8/1966 | Bramberry | 277/224 |
| 3,896,280 | 7/1975 | Blake | 340/686 |
| 4,167,134 | 9/1979 | Yuda | 91/405 |
| 4,176,264 | 11/1979 | Tann | 200/82 E |
| 4,181,835 | 1/1980 | Stadler | 200/82 E |
| 4,211,123 | 7/1980 | Mack | 74/99 A |
| 4,234,223 | 11/1980 | O'Neil | 294/88 |
| 4,492,400 | 1/1985 | Yuda | 294/115 |
| 4,566,727 | 1/1986 | Yuda | 294/115 |

FOREIGN PATENT DOCUMENTS

| 939187 | 2/1956 | Fed. Rep. of Germany | 277/223 |
|---|---|---|---|
| 883957 | 8/1943 | France | 277/223 |

Primary Examiner—Daniel M. Yasich
Attorney, Agent, or Firm—Bailey & Hardaway

[57] ABSTRACT

A robotic apparatus is provided with a separate ring of rubberized magnetic material with means for positioning the magnetic ring upon the piston which is of integral construction for actuating external signaling means.

5 Claims, 12 Drawing Figures

ROBOTIC CONTROL APPARATUS

Background of the Invention

Rubberized magnetic material having endless rings have been utilized on two-part cylinder construction wherein the ring is sandwiched in between the parts. It is common practice to provide in axially spaced relation thereto a seal to prevent fluid from flowing between the piston and the cylinder wall. These seals are generally spaced one-way seals, and a tubular construction is utilized in the cylinder and related parts so that the overall structure is relatively long and is of excessive length for some purposes.

The apparatus of the present invention is preferably used with robotic grippers or fluid actuators of the type illustrated in U.S. Pat. Nos. 4,566,727 and 4,492,400 or other grippers having fingers including those illustrated in U.S. Pat. Nos. 4,234,223, 4,211,123, 4,167,134 and 4,211,123. However, an apparatus may be used in any robotic gripper having a disk with sensing means external the cylinder for controlling the operating mechanism, as for example in a robotic push-pull mechanism.

Accordingly, it is an important object of this invention to provide a robotic apparatus including a cylinder and operating mechanism having a reduced length wherein the piston is of unitary construction and of minimal length.

Another important object of this invention is to provide a robotic actuator device having a piston of unitary construction wherein a split rubberized ring of magnetic material may be placed and confined within a groove in the cylinder to avoid the necessity for sandwiching the magnetic ring between separate parts of the piston.

Another important object of this invention is the provision of a unitary piston for use in a robotic actuator device wherein the piston is of unitary construction with sealing means best provided in such a way that the overall length is reduced.

SUMMARY OF THE INVENTION

Apparatus for controlling a robotic gripping or moving apparatus with or without fingers utilizing a ring of rubberized magnetic material controlled by a piston has an annular receptacle in the piston for carrying a separate ring, and means are provided for confining the ring within the annular receptacle for carrying the ring to the piston. Sealing means are also carried by the piston which is of integral construction. The magnetic material actuates a signaling apparatus external to the cylinder for indicating or controlling the position of the piston and the operating mechanism operated thereby.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a robotic apparatus utilizing a ring of resilient flexible magnetic material carried by a piston within a cylinder for signaling a control means as to the position of the piston and the apparatus operated thereby. Means mounting the ring of magnetic material A on the piston include an annular receptacle B (FIG. 10) in the piston. The ring of magnetic material is separated as at C (FIG. 10) and has opposed ends facilitating placement of the ring within the annular receptacle extending about the piston. Means D within the annular receptacle confine the ring and secure same to the piston. The piston is of unitary integral construction, and sealing means E are carried by the piston preventing the passage of an operating fluid between a piston wall and a cylinder wall. Preferably, the ring of magnetic material has a pair of opposed adjacent ends, or it may be divided into a plurality of segments or disks positioned adjacent each other. The ring of magnetic material may be confined within the annular receptacle by walls of the annular receptacle or by annular fastening means about an outer periphery of the ring. The sealing means is preferably spaced longitudinally of the ring.

Figure 1:
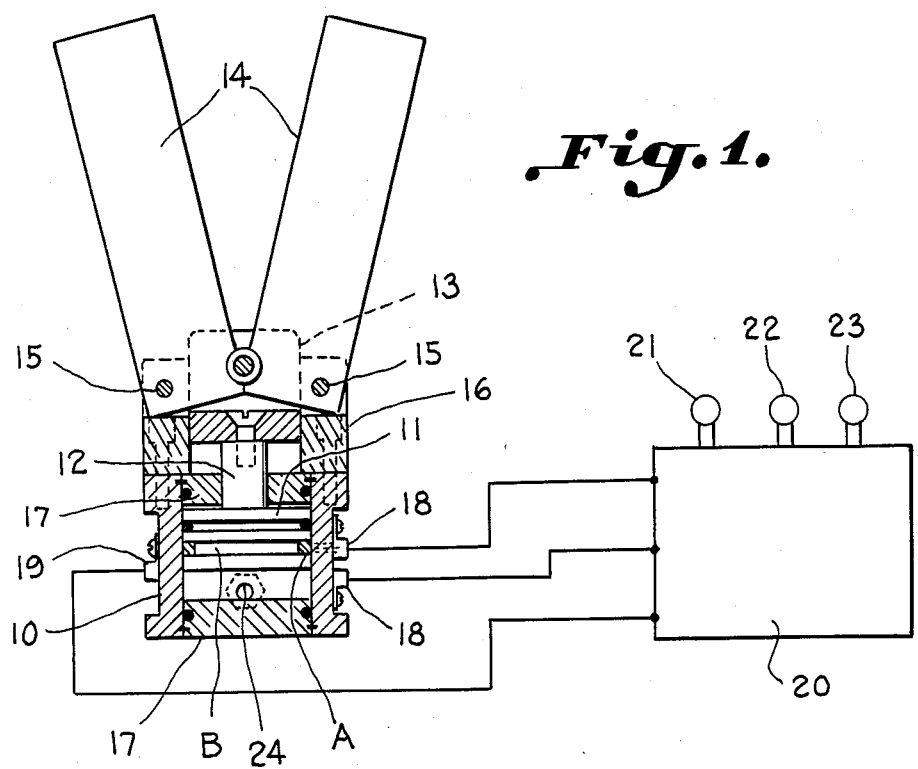
FIG. 1 is a schematic side elevation illustrating a robotic gripper provided with controlling apparatus construction in accordance with the present invention for an operating mechanism associated with the robotic apparatus.

The operating apparatus of the present invention is illustrated in FIG. 1 as including a cylinder 10 having a piston 11 provided with suitable connection through the rod 12 with a clevis bracket 13 for operating gripper fingers 14. The fingers are pivoted as at 15 at their lower ends upon the housing 16 which extends upwardly from the cylinder. The cylinder has stops 17 carried at each end. The cylinder is illustrated as being provided with vertically spaced aligned signaling switches 18 which together with a sensing switch 19 spaced intermediate the switches 18, however on the opposite side of the cylinder, operates any desired means such as the signal means schematically illustrated at 20, which includes a light 21 indicating when on that the apparatus is ready for actuating the gripping fingers. The light 22, actuated by the switch 19, illustrates that the piston and fingers or other mechanism actuated thereby, is in intermediate position while the light 23 indicates that the fingers are in extreme or closed position.

Figure 2:
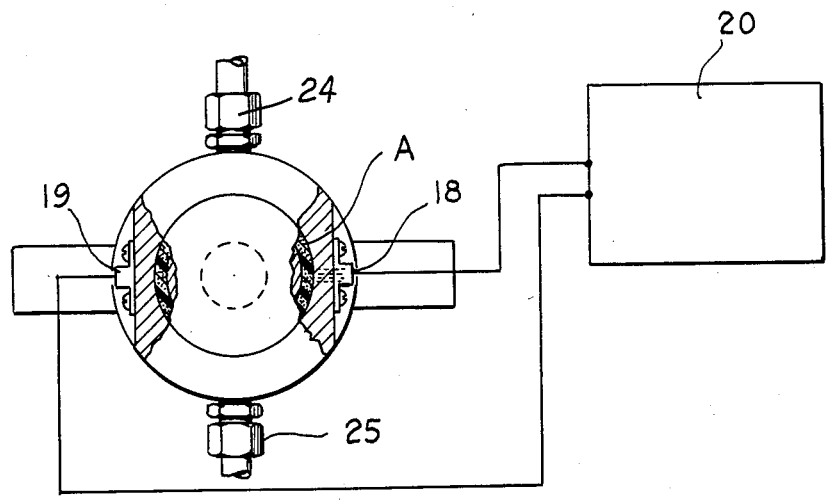
FIG. 2 is a bottom plan view, partially in section, further illustrating the apparatus of FIG. 1.

FIG. 2 illustrates the fluid operated mechanism having connections 24 and 25 for actuating the piston. The switch mechanism 18 and 19 are further illustrated or actuating the control mechanism 20.

Figure 3:
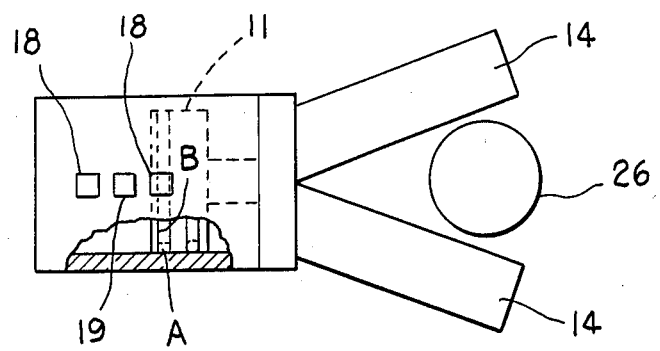
FIG. 3 is a schematic view illustrating a robotic gripper having its fingers separate preparatory to closing upon an object to be gripped.
Figure 4:
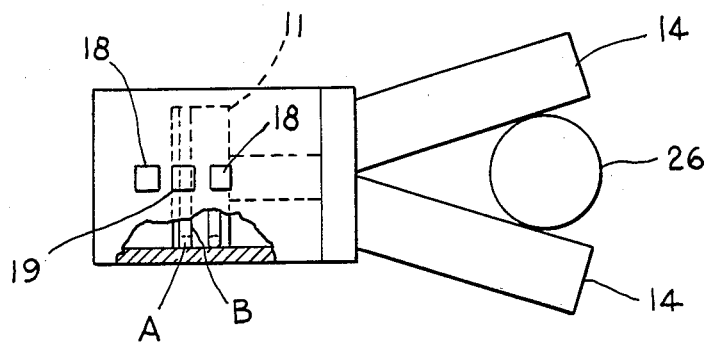
FIG. 4 is a schematic elevation illustrating the robotic gripper with the fingers in an intermediate position.
Figure 5:
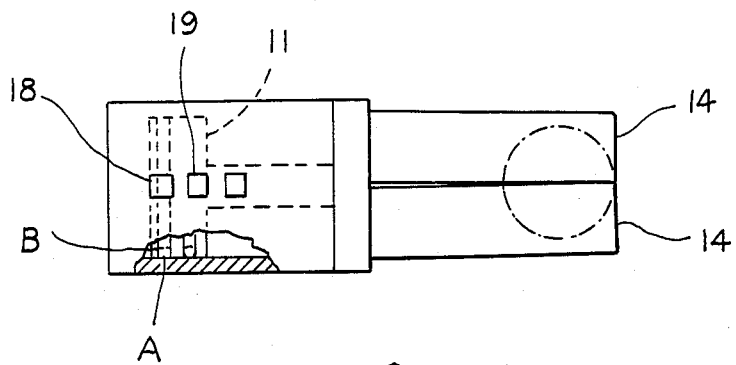
FIG. 5 is a schematic elevation illustrating the gripper with fingers in closed position.

FIGS. 3 through 5 illustrate the various positions of the fingers 14 in respect to a object 26 to be gripped by the fingers and the relationship of the piston 11 to the switches 18 and intermediate switch 19 which is schematically illustrated as being in alignment with the switches 18. In each instance the piston is illustrated as being of unitary construction wherein a rubberized magnetic ring A is carried within an annular receptacle B.

Figure 6:
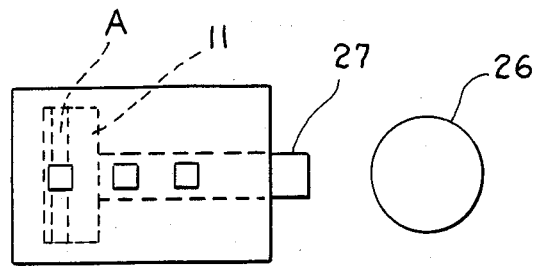
FIG. 6 is a schematic elevation illustrating a robotic gripper having a plunger in retracted position preparatory to pushing an object.
Figure 7:
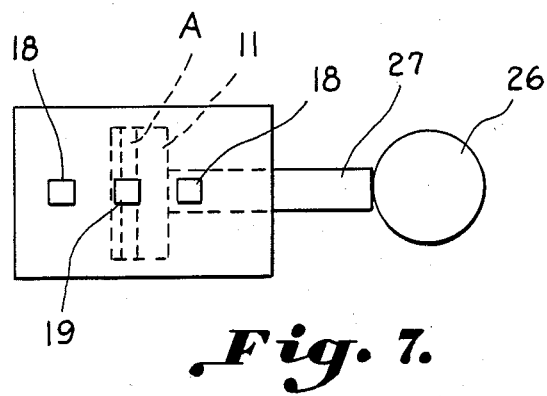
FIG. 7 is a schematic elevation illustrating a robotic apparatus having a plunger in intermediate position engaging an object for pushing.
Figure 8:
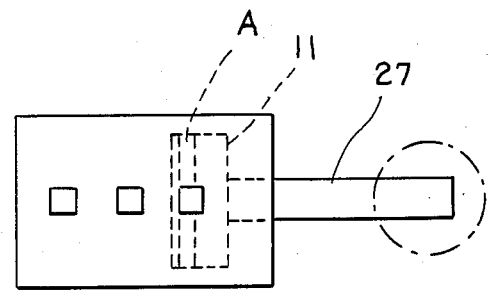
FIG. 8 is a schematic elevation illustrating the robotic apparatus with a plunger in forward most position.

FIGS. 6 through 8 illustrate a similar relation between the parts of a push-pull robotic apparatus wherein a cylinder 11 actuates a plunger 27 for acting upon the object schematically illustrated at 26 being moved thereby. The relationship between the magnetic ring A carried by the unitary piston and the switches 18 and 19 are illustrated sequentially wherein at FIG. 6 the parts are ready for movement to act upon the work piece 26.

FIG. 7 illustrates the part in intermediate position in engagement with the work piece, and FIG. 8 illustrates the plunger in extreme extended position.

Figure 9:
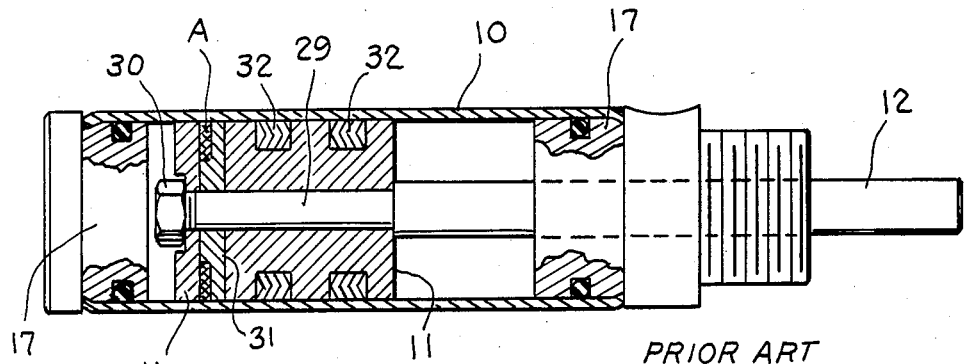
FIG. 9 is a schematic elevation illustrating the prior art tubular construction with a two-piece piston confining a rubberized magnetic ring in sandwiched relation.

FIG. 9 illustrates the prior art wherein the cylinder 10 is of tubular construction having end pieces 17 carrying a two-part piston 11 there between. The piston has a rod 12 extending therefrom as for actuating a clevis bracket on one end. On the opposite end the rod carries a threaded shank 29 having a bolt 30 threaded upon the free end thereof. The piston has a split end portion 11a utilized for sandwiching the rubberized ring of magnetic material A between it and the body 11 of the piston. A magnetic ring A is illustrated as being carried by a grooved insert 31, all of these parts being drawn together by the shank 29. The one-way seals are illustrated in axially spaced relation as in 32.

Figure 10:
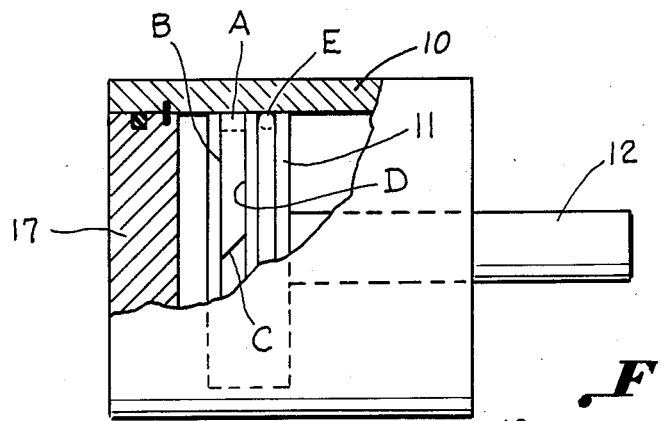
FIG. 10 is an enlarged side elevation, partially in section, illustrating a split ring with receptacle walls confining the ring upon the unitary cylinder.

FIG. 10 illustrates the invention wherein a split ring or magnetic rubberized material is illustrated at A being confined within an annular groove B. The ring has opposed or split ends C, and the ring is confined within the annular receptacle between walls D. An axially seal E is provided in the form of an O-ring to prevent the passage of fluid between the inner walls of the cylinder 10 and the piston 11.

Figures 11, 12:
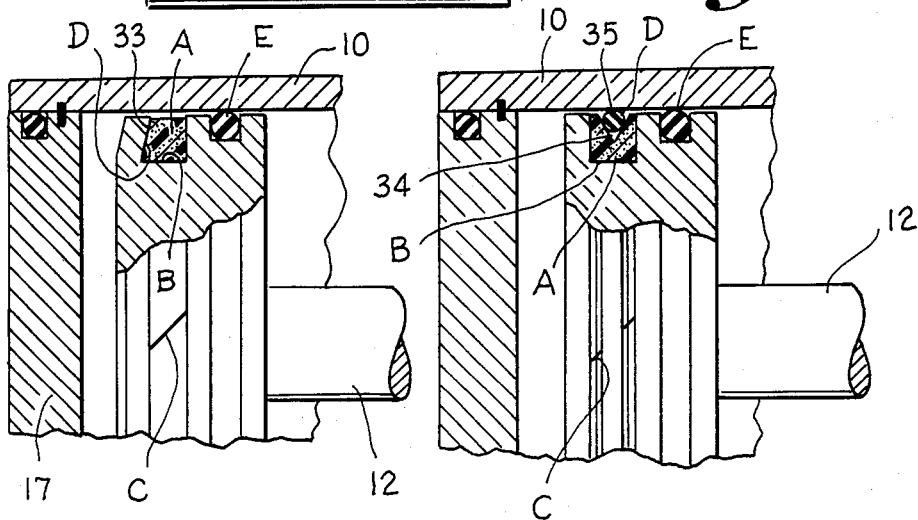
FIG. 11 is an enlarged elevation, partially in section, illustrating the unitary cylinder wherein the walls are specially configured to engage the rubberized ring.
FIG. 12 is an elevation, partially in section, illustrating a modified form of the invention wherein an O-ring is used to confine a split ring within the receptacle upon the unitary cylinder and wherein a spaced axially O-ring seal is provided.

FIG. 11 further illustrates the invention wherein the walls D are illustrated as including an inwardly inclined inner wall 33 for confining the rubberized ring of magnetic material A within the receptacle B.

FIG. 12 illustrates a modified form of the invention wherein the rubberized ring A has a V-slot 34 in the outer periphery thereof, and an O-ring 35 is carried therein to confine the ring which is split as at C within the receptacle B. While it may be possible to utilize an O-ring 35 as a sealing means, an additional O-ring is illustrated at E in FIG. 12 for acting as an additional seal.

It is important that the ring of rubberized material which is of a type supplied by 3M containing iron particles in the rubbery material, engage the inner wall of the piston. The rubberized magnetic material is of the type often utilized as seals for refrigerator doors. The ring, if not so contained would engage the inner wall of the cylinder which walls of the cylinder, would wear as a result of contact by the magnetic material causing deterioration of the ring as well as the inner wall of the cylinder. By confining the rubberized ring within a groove within a unitary piston, it is possible to reduce the length of the piston and related apparatus. By splitting the ring or utilizing a segmented ring or ring formed of a series of circumferentially positioned magnetic disks or rubberized material, it is possible to place the magnetic material within the groove while a number of means may be utilized as illustrated for retaining the rubberized material within the receptacle on the unitary piston.

While a preferred embodiment of the invention has been described using specific terms, such description is for illustrative purposes only, and it is to be understood that changes and variations may be made without departing from the spirit or scope of the following claims.

What is claimed is:

1. In a robotic apparatus or fluid actuators utilizing a ring of resilient flexible magnetic material formed of rubbery material having magnetic particles therein carried by a piston within a cylinder for signaling at least one control means as to the position of the piston and the apparatus operated thereby, means mounting said ring of magnetic material on said piston comprising:

an annular receptacle carried in said piston, said ring of magnetic material being separated and having opposed ends facilitating placement of the ring within said annular receptacle extending about the piston, means within said annular receptacle confining said ring and securing same to said piston and out of contact with a wall of said cylinder, said piston being of unitary integral construction and is connected to means extending outside the cylinder for performing a function, and sealing means carried by said piston preventing the passage of an operating fluid between a piston wall and said cylinder wall.

2. The structure set forth in claim 1 wherein said ring has a pair of shaped opposed adjacent ends.

3. The structure set forth in claim 1 wherein said means confining said ring includes walls of said annular receptacle.

4. The structure set forth in claim 1 wherein said means confining said ring includes an annular fastening means about an outer periphery of said ring.

5. The structure set forth in claim 1 wherein said sealing means is spaced longitudinally of said ring.

* * * * *